T. H. TRACY.
SURVEYOR'S MEASURING LINE.
APPLICATION FILED JAN. 12, 1909.
950,581.
Patented Mar. 1, 1910.
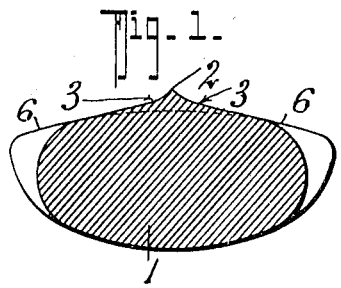
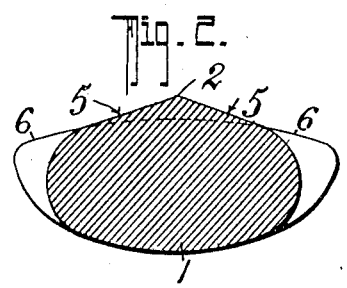
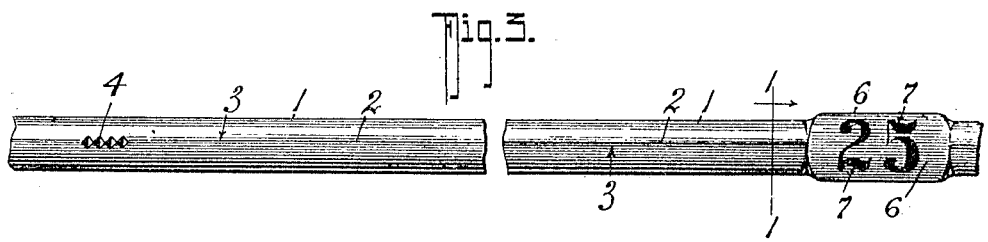
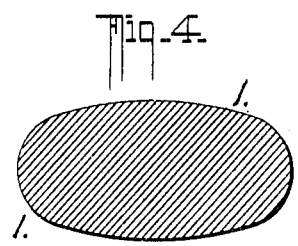
WITNESSES:
Charles H. Wagner.
H. Woodard
INVENTOR
Thomas H. Tracy.
BY
Fred G. Dietterich
ATTORNEY.

UNITED STATES PATENT OFFICE.

THOMAS H. TRACY, OF VANCOUVER, BRITISH COLUMBIA, CANADA.

SURVEYOR'S MEASURING-LINE.

950,581.     Specification of Letters Patent.     Patented Mar. 1, 1910.

Application filed January 12, 1909. Serial No. 471,945.

*To all whom it may concern:*

Be it known that I, THOMAS H. TRACY, a citizen of the Dominion of Canada, residing at Vancouver, in the Province of British Columbia, Canada, have invented a new and useful Surveyor's Measuring-Line, of which the following is a specification.

This invention relates to a metal measuring line or wire such as is used by engineers and surveyors, and my improvement is directed to the use of a cross section of wire that will not be liable to "kink," and such as will enable one side to be distinguished by the sense of touch from the other, that the side on which the graduations are marked may be determined as the line draws through the hand.

A flat steel tape is obviously the most convenient on which to indicate graduations but unfortunately is the one most liable to "kink" and be broken, and is also if thin considerably weakened when attacked by rust: A round wire again, though it will not "kink" readily if properly tempered, is not convenient to indicate graduations on and has no distinguishable side. I overcome these difficulties by adopting a cross section such as is set forth in the following specification and illustrated in the drawings by which it is accompanied, in which:

Figures 1 and 2 are cross sections, much enlarged, having the same characteristics and Fig. 3 a plan of that set forth in Fig. 1. Fig. 4 is a cross section of a further modification.

The cross section illustrated in Fig. 1 is a flattened ellipse which gives a strength to resist "kinking" and also one that corrosion will not have an unrubbed surface to attack. It also lends itself readily to the reception or attachment of graduation marks.

To distinguish one side from another a longitudinal ridge 2 extends from end to end, with well rounded fillets at 3 to avoid corners where rust might form. This ridge may be notched as at 4 to enable graduations to be detected and indicated as the line draws through the hand, as the number of notches may indicate the number of units of measurement up to say four.

In the modification shown in Fig. 2 the same principle prevails one of the flatter sides rises to the middle in a flattened angle 5 which serves the same purpose as the ridge 2 in Fig. 1.

The graduations may be indicated on the line in any suitable manner but this is not material to the subject of this application which is directed to the adoption of a cross section of the line having certain characteristics for the purposes specified.

The ridge 2 or flattened angle 5 may at certain intervals, multiples of the unit of measurement marked on the line, be flattened as indicated by dot and dash lines in Figs. 1 and 2 and as shown in the plan and will be detected as the line draws through the hand, while such flattening will not weaken the line to any appreciable extent.

A line is thus provided that will not readily "kink", that will lend itself to any approved system of marking the graduations and the sides of which are distinguishable one from the other as the line draws through the hand. It is also free from flat or depressed surfaces of any extent on which rust may form and will not be sensibly weakened by rust if it does form on it. The flattened portions which are provided at certain intervals, multiples of the unit of measure marked on the line, are indicated at 6 on the drawing.

Having now particularly described my invention and the objects attained by it, I hereby declare that what I claim as new and desire to be protected in by Letters Patent is:

1. A measuring line of approximately elliptical cross section and having a ridge extending lengthwise along one of the flatter sides, said ridge having interruptions at definite locations.

2. A measuring line, the cross section of which is approximately an ellipse and having a ridge extending lengthwise along one of the flatter sides throughout the length of the line, said line having flattened portions interrupting the ridge at predetermined intervals.

3. A measuring line, the cross section of which is approximately an ellipse and having a ridge extending lengthwise along one of the flatter sides throughout the length of the line, said line having flattened portions interrupting the ridge at predetermined intervals, and having notches in said ridge at other predetermined intervals.

4. A measuring line comprising a long flexible strip of substantially elliptical shape in cross section and having a longitudinal ridge along one of the flatter sides, substantially as shown and for the purposes described.

THOMAS H. TRACY.

Signed in the presence of—
ROWLAND BRITTAIN,
ALFRED M. POUND.